(12) United States Patent
Graves (10) Patent No.: US 8,144,618 B2
(45) Date of Patent: Mar. 27, 2012

(54) METHOD AND APPARATUS FOR AUTOMATIC VERIFICATION OF A ZONE CONFIGURATION AND NETWORK ACCESS CONTROL CONSTRUCT FOR A PLURALITY OF NETWORK SWITCHES

(75) Inventor: David Andrew Graves, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1649 days.

(21) Appl. No.: 11/048,311

(22) Filed: Jan. 31, 2005

(65) Prior Publication Data
US 2006/0171384 A1 Aug. 3, 2006

(51) Int. Cl.
*H04L 12/28* (2006.01)

(52) U.S. Cl. ......... 370/254; 370/363; 370/374; 709/224

(58) Field of Classification Search .................. 370/368, 370/374, 254, 363, 378; 709/224
See application file for complete search history.

(56) References Cited

U.S. PATENT DOCUMENTS

| | | | |
|---|---|---|---|
| 6,839,746 B1 * | 1/2005 | Muthiyan et al. | 709/220 |
| 7,107,328 B1 * | 9/2006 | Muthiyan et al. | 709/220 |
| 7,194,538 B1 * | 3/2007 | Rabe et al. | 709/224 |
| 7,275,103 B1 * | 9/2007 | Thrasher et al. | 709/224 |
| 7,302,570 B2 * | 11/2007 | Beard et al. | 713/171 |
| 7,328,260 B1 * | 2/2008 | Muthiyan et al. | 709/224 |
| 7,349,382 B2 * | 3/2008 | Marimuthu et al. | 370/351 |
| 7,493,562 B2 * | 2/2009 | Kui et al. | 715/736 |
| 2004/0006612 A1 * | 1/2004 | Jibbe et al. | 709/223 |
| 2004/0078599 A1 * | 4/2004 | Nahum | 713/201 |
| 2004/0090925 A1 * | 5/2004 | Schoeberl et al. | 370/254 |
| 2005/0055428 A1 * | 3/2005 | Terai et al. | 709/220 |
| 2006/0026263 A1 * | 2/2006 | Raghavan et al. | 709/217 |
| 2006/0265515 A1 * | 11/2006 | Shiga et al. | 709/238 |

* cited by examiner

*Primary Examiner* — Chirag Shah
*Assistant Examiner* — Jay P Patel (57) ABSTRACT

Embodiments of the invention provide a method and an apparatus for automatic verification of a zone configuration of a plurality of network switches. In one method embodiment, the present invention accesses an actual network access control construct and an actual zone configuration for a plurality of network switching devices. Additionally, a machine-readable map of the network is accessed, the map providing a pre-determined network access control construct defining the device which should be coupled with the network switching device and a pre-determined zone configuration defining the switching devices which should be part of the zone. An automatic verification is performed, wherein the verification verifies that the actual network access control construct and the actual zone configuration of network switching devices correlates with the pre-determined network access control construct and zone configuration defined by the machine-readable map.

36 Claims, 6 Drawing Sheets

Start

↓

Accessing an actual network access control construct on a network switching device, the actual network access control construct for defining the device actually coupled with the network switching device.
501

↓

Accessing an actual zone configuration comprising a plurality of network switching devices, the actual zone configuration for defining the switching devices which are actually part of the zone.
502

↓

Accessing a machine-readable map of the network, the map providing a pre-determined network access control construct defining the device which should be coupled with the network switching device and a pre-determined zone configuration defining the switching devices which should be part of the zone.
504

↓

Automatically verifying that the actual network access control construct and the actual zone configuration of network switching devices correlates with the pre-determined network access control construct and zone configuration defined by the machine-readable map.
506

↓

End

METHOD AND APPARATUS FOR AUTOMATIC VERIFICATION OF A ZONE CONFIGURATION AND NETWORK ACCESS CONTROL CONSTRUCT FOR A PLURALITY OF NETWORK SWITCHES

TECHNICAL FIELD

The present invention generally relates to network switches. More specifically to a system and method for automatic verification of a zone configuration and network access control construct for a plurality of network switches.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems and switches (as well as other devices). Another common type of network configuration is a storage area network (SAN). In actual practice, a typical SAN will include large numbers of disk logical units (LUNs) of a disk array and switches (as well as other devices). Devices such as computer systems, routers, switches, load balancers, firewalls, and the like, are commonly linked to each other in networks.

Generally, data centers include technicians working from a network operation center (NOC). The technicians issue commands to control the deployment of servers and to control the supporting infrastructures, such as disk logical units (LUNs) in a disk array, network switches in the LAN, and switches in the SAN.

Once the servers, the SAN switches and the disk array have been configured to properly map one or more LUNs to a server, additional security can be achieved by defining a network access control construct, such as an access control list (ACL), that specifies the source and destination port identifiers for the devices that are allowed to communicate via the ports of the SAN switches. Therefore, the ACL prevents abusive or erroneous use of the SAN including access to the LUNs of the disk array in an unauthorized manner.

Additional security can also be achieved by defining a zone configuration that specifies the source and destination devices that should be allowed to communicate via the ports of the SAN switches. Therefore, the zone prevents abusive or erroneous use of the SAN including accessing the disk array in an unauthorized manner.

In present operation, the devices which are a part of the zone configuration are configured by commands from the NOC, include many steps which must be coordinated. This method is expensive and prone to error, especially if the data center environment is dynamic, with high demand for changes in computer deployment and therefore a need to change the devices of the zone configuration. Additionally, a malicious attack on the configuration of the zone could result in alteration of zone configurations, thereby allowing the attacker to access confidential data.

DISCLOSURE OF THE INVENTION

Embodiments of the invention provide a method and an apparatus for automatic verification of a zone configuration of a plurality of network switches. In one method embodiment, the present invention accesses an actual network access control construct and an actual zone configuration for a plurality of network switching devices. Additionally, a machine-readable map of the network is accessed, the map providing a pre-determined network access control construct defining the device which should be coupled with the network switching device and a pre-determined zone configuration defining the switching devices which should be part of the zone. An automatic verification is performed, wherein the verification verifies that the actual network access control construct and the actual zone configuration of network switching devices correlates with the pre-determined network access control construct and zone configuration defined by the machine-readable map.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. RAM, ROM, magnetic disk, optical disk and a disk drive are examples of computer-usable medium. The instructions that are stored on a computer-usable medium are examples of computer-readable program code that is stored therein.

Embodiments of the present invention relate to the automatic verification of zone configurations for a network such as a storage area network (SAN). The present description begins with an overview of a network map and one embodiment of a network environment. The details of the network access control construct and zone configuration use and operation are then described in detail.

In one embodiment, the network map lists each individual network device and the attributes of the device. For example, the attributes of a device may include, but are not limited to, the make, model, type, role, and unique identifier of the device. Additionally, the network map may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable. One exemplary embodiment of a network which results from a network map is shown in FIG. 1.

Figure 1:
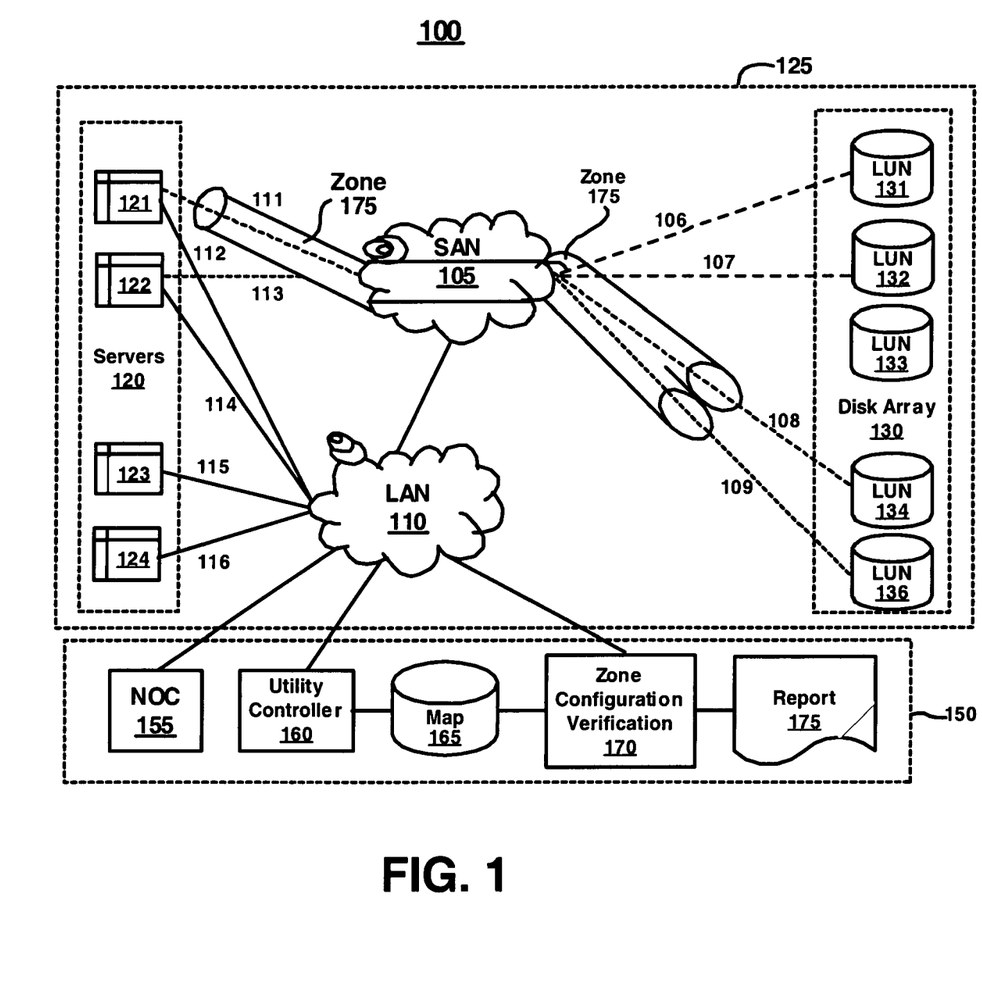
FIG. 1 is a block diagram of an exemplary network including a LAN and SAN upon which embodiments of the present invention can be implemented.

With reference now to FIG. 1, a block diagram of an exemplary network 100 is shown in accordance with one embodiment of the present invention. In general, network 100 includes a provisionable portion 125 and a utility data center portion 150. In one embodiment, provisionable portion 125 includes a local area network (LAN) 110 communicatively coupled with a storage area network 105. LAN 110 can include elements such as racks, routers, cables, switches and other elements that are well known in the art. SAN 105 can also include elements such as switches, routers, cables, and the like. Network 100 also includes a plurality of servers 130 coupled with both the SAN 105 and the LAN 110. Additionally, network 100 includes a plurality of LUNs within a disk array 130 coupled with SAN 105.

In one embodiment, the data center portion 150 includes the network operations center 155, a utility controller 160, a network map 165, a network access control construct and zone configuration verification portion 170, and a report portion 175. As described herein, the network operation center 155 is a central management location accessible to technicians. The utility controller 160 is an automated process for managing the network. The network map 165 is a machine-readable map of the actual physical layout of the network as well as the up-to-date allocation of the network 100 resources (e.g., the provisionable portion 125). The network access control construct and zone configuration verification portion 170 and the optional report 175 are described in more detail herein.

In one embodiment, LAN 110 and SAN 105 include a number of connections 111 through 116 coupled to a number of computing devices 121-124 (e.g., servers 120). Typically, the servers 121-124 are connected with the LAN 110 or SAN 105 using cables or the like. However, wireless connections between the computing devices and LAN 110 and/or SAN 105 are also contemplated.

In another embodiment, SAN 105 includes a number of connections 106 through 109 coupled to a disk array 130 having a number of logical unit identifiers (LUNs) 131-136. Typically, the LUNs 131-136 are stored in a single location, although this may not always be the case. In this embodiment, the LUNs 131-136 are shown as being interconnected with the SAN 105 using cables or the like. However, wireless connections between the LUNs 131-136 in SAN 105 are also contemplated.

Figure 2:
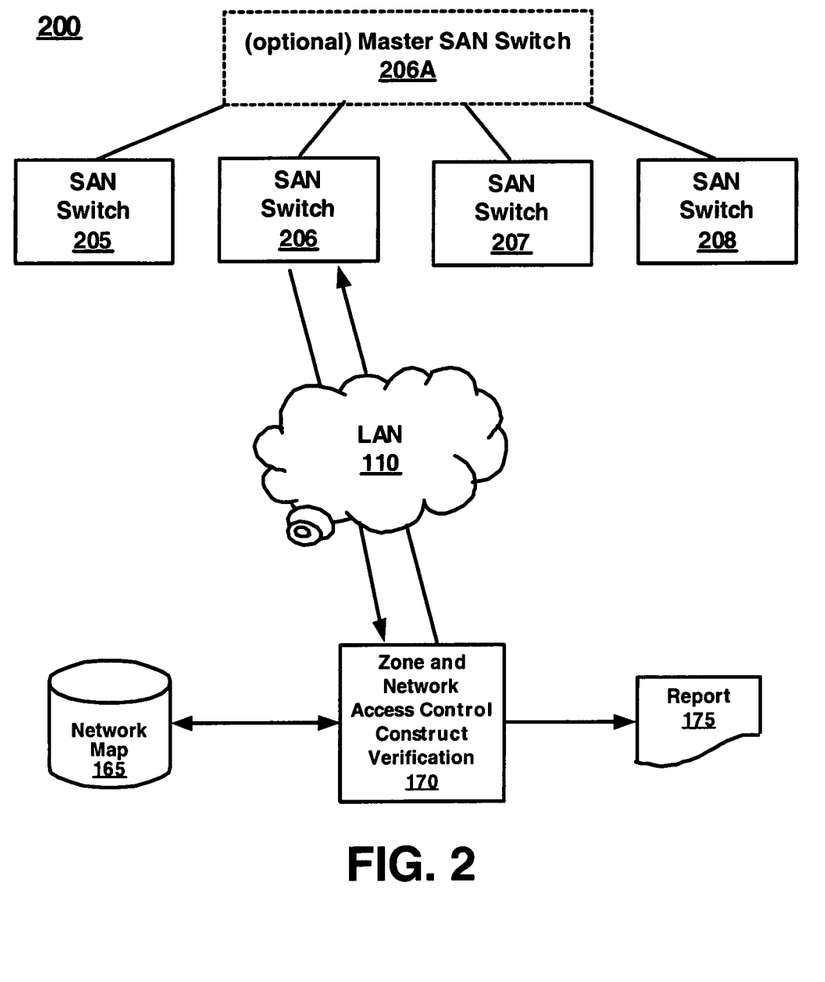
FIG. 2 is a block diagram of the network access control construct and zone configuration verification program accessing the network switches in accordance with one embodiment of the present invention.

In one embodiment, the connections 111-116 and 106-109 are connected to switches such as the switches 205-208 of FIG. 2. That is, although switches 205-208 are SAN switches, they may just as appropriately be a combination of LAN and SAN switches. In general, the switches are capable of being programmed or configured such that SAN 105 are logically separated into a number of virtual SANs (VSANs). The programming or configuring of these switches can be changed, thereby changing the resources allocated to the various VSANs. For example, by changing the configuration of switch 205, computer system 120 can be "virtually moved" from one VSAN to another.

The allocation and reallocation of resources between VSANs is one of the valuable operations performed after the actual physical building of the network structure. In one embodiment, the VSANs are referred to as zones. That is, the devices allocated to the VSAN are allocated in zones. Wherein, the security for the VSAN is controlled by ensuring that only the designated devices within the VSAN zone can access the data within the designated zone.

One example of a VSAN is shown by the dotted line in FIG. 1 wherein a server 121 is in a VSAN including cable 111 via SAN 105 and further including LUNs 134 and 136 and also cables 108 and 109. The associated zone is shown with piping and labeled zone 175. For example, the zone 175 for the VSAN described herein includes the cabling 111 from the server 121, the SAN switches within SAN 105 and the cables 108 and 109 up to the connection with the LUNs 134 and 136. That is, the zone includes the cabling and switches from the server(s) of server 120 to the LUNs of the disk array 130. A second example of a SAN zone is shown in FIG. 1 wherein a server 122 is coupled with a SAN zone including cable 113 via SAN 105 and further including cables 106 and 107 coupled with LUNs 131 and 132. It is appreciated that there may be a plurality of zones within a network such as network 100. Moreover, it is appreciated that a single connection between a server 120 and a LUN within the disk array 130 would form a zone configuration.

In addition to computer systems and switches, LAN 110 and SAN 105 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the SAN and a representation of each VSAN. Other information included in a network map includes, but is not limited to: the network or MAC (media access control) address for the resources of the LAN; the port numbers of the configurable devices; the World Wide Name (WWN) for each port in the SAN switches; the WWN for each port in the disk array; the WWN for each data port in the servers; the socket identifier for each cable connected to each of the resources of LAN and/or SAN; manufacturer and model numbers; and serial numbers.

With reference now to FIG. 2, the network access control construct (in one embodiment an access control list (ACL)) and zone configuration verification program 170 reads the desired configuration from the network map 165 and then accesses one or more of the SAN switches (e.g., 205-208). In one embodiment, the network access control construct and zone configuration verification program 170 accesses the switches over the LAN 110. In another embodiment, the network access control construct and zone configuration verification program 170 may access only a master SAN switch (e.g., optional master SAN switch 206A) which will provide the information for itself and every slave SAN switch it maintains.

The network access control construct and zone configuration verification program 170 will check the ACL definitions, verifying the validity of the ACLs, and identifying any errors associated therewith by comparing the actual ACL configurations with the ACL configurations outlined in the network map. In addition, the network access control construct and zone configuration verification program 170 will check the zone definitions, verifying the validity of the zones, and identifying any errors associated with the zones by comparing the actual zone configurations with the zone configurations outlined in the network map.

Examples of the network access control construct and zone errors may include errors of omission, errors of inclusion, errors of correctness, or the like. In one embodiment, configuration errors in the network access control construct and zone are corrected by reconfiguring the SAN switches. In another embodiment, the network access control construct and zone configuration verification program 170 creates a script that can be verified and approved by technical personnel, prior to running the script to make the corrections. The network access control construct and zone configuration verification program 170 can optionally create a detailed report, indicating all of the network access control constructs and/or zones that were checked, and indicated which network access control constructs and/or zones were correct, thus providing an automated audit of SAN security. In another embodiment, the network access control construct and zone configuration verification program 170 can optionally create a detailed report of which network access control constructs and/or zones were invalid, and the specific details of which data item in the network access control construct and/or zone was incorrect and what the correct value should be.

Figure 3:
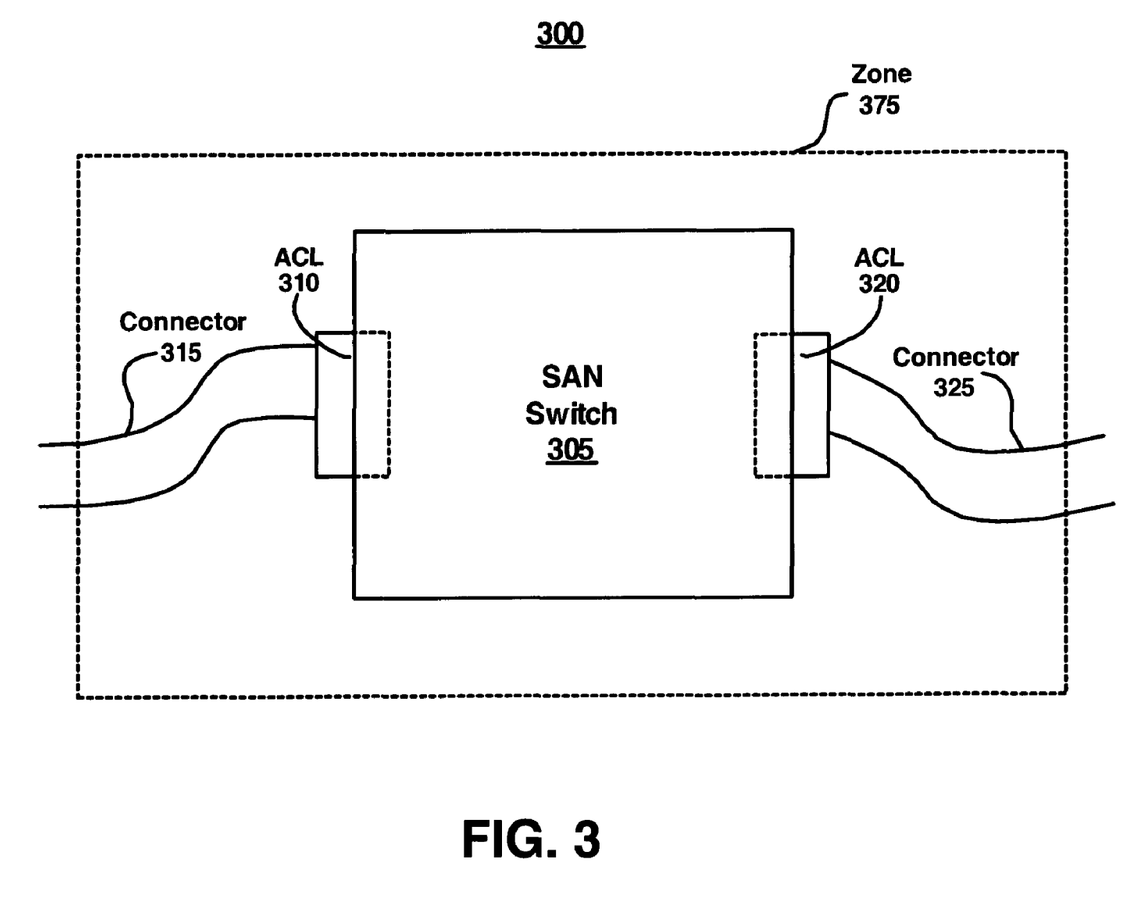
FIG. 3 is a block diagram of an exemplary switch having a network access control construct and zone configuration in accordance with one embodiment of the present invention.

With reference now to FIG. 3, a block diagram 300 of a SAN switch 305 is shown in accordance with one embodiment of the present invention. In general, SAN switch 305 includes a SAN switch memory 307, a plurality of access control constructs (e.g., ACLs 310-312 and 320-322), and ports 333-338. It is appreciated that although six ports are shown SAN switch 305 may have more or fewer ports. In addition, although an ACL is shown for each port, there may be ports within SAN switch 305 that do not have an associated ACL coupled therewith. In one embodiment, SAN switch 305 has an input ACL 310 which is coupled with port 334. Moreover, port 334 is utilized by the connection 315 to connect with the SAN switch 305. Additionally, the SAN switch 305 has an output ACL 320 which is coupled with port 337. Moreover, the port 337 is utilized by the connection 325 to connect with the SAN switch 305. Although one of the sets of ports, ACLs and connectors is stated as an input and one as an output, it is appreciated that the data may flow either direction. The utilization of designated input and output sides is merely for purposes of clarity during the description. In one embodiment, the ACL is a software program stored in the SAN switch memory 307, such as a program stored in a flash memory, or the like. Moreover, switch 305, the ACLs and the connections are a part of a zone 375. In one embodiment, zone 375 includes a plurality of ports on the switch, or a plurality of switches and ports. The actual size of the zone will vary according to the size of the established VSAN and the number of connections, devices and switches associated therewith.

As described herein, the ACL (e.g., 310-312 and/or 320-322) is utilized to provide a "security gate" between the connection and the switch. For example, connector 315 is coupled with SAN switch 305 on one end. On the other end, connector 315 is coupled with a computing device (e.g., server 121). In the network map, the connector 315 is dedicated to a specific computing device. Therefore, the specific computing device (e.g., server 121) will have a specific name, for example, an identifier such as a World Wide Name (WWN) that will differentiate the computing device (e.g., server 121) from other computing devices (e.g., server 122).

To ensure that only the designated computing device (e.g., server 121) is accessing the SAN switch 305 via a specific port, a network access control construct, such as the ACL 310, is utilized to check the WWN (or other type of identifier) of the computing device (e.g., server 121) coupled with connector 315. By utilizing the ACL 310 to check the identification of the accessing computing device (e.g., server 121) prior to the device actually accessing the switch (e.g., SAN switch 305), security of the network is maintained. That is, since the computing device (e.g., server 121) is identified prior to accessing the SAN switch 305, there is a security barrier stopping unauthorized computing systems from accessing and/or utilizing SAN switch 305 and any components coupled therewith.

As described herein, the zone 375 is utilized to provide a "security blanket" around the connections and the switch or switches. For example, connector 315 is coupled with switch 305 on one end. On the other end, connector 315 is coupled with a computing device (e.g., server 121). In the network map, the connector 315 is dedicated to a specific computing device. Therefore, the specific computing device (e.g., server 121) will have access to the zone while other computing devices (e.g., server 122) will not be a part of the zone 375.

Therefore, the zone 375 ensures that only the designated computing device (e.g., server 121) is accessing the switch 305 via a specific port. By utilizing the zone configuration verifier to check the identification of the cables and switches, security of the network is maintained. That is, since the computing device (e.g., server 121) is identified via its connection prior to accessing the switch 305, there is a security blanket stopping unauthorized computing systems connections from accessing and/or utilizing switch 305 within the specified zone 375.

Thus, by utilizing both network access control constructs and zones within the SAN, the security of the SAN is two fold. That is, the overall connections and switches are protected via the zone configuration and each port on the SAN switch is protected by the ACL. In so doing, the security of the SAN fabric is protected from eavesdropping as well as individual penetration.

Figure 4:
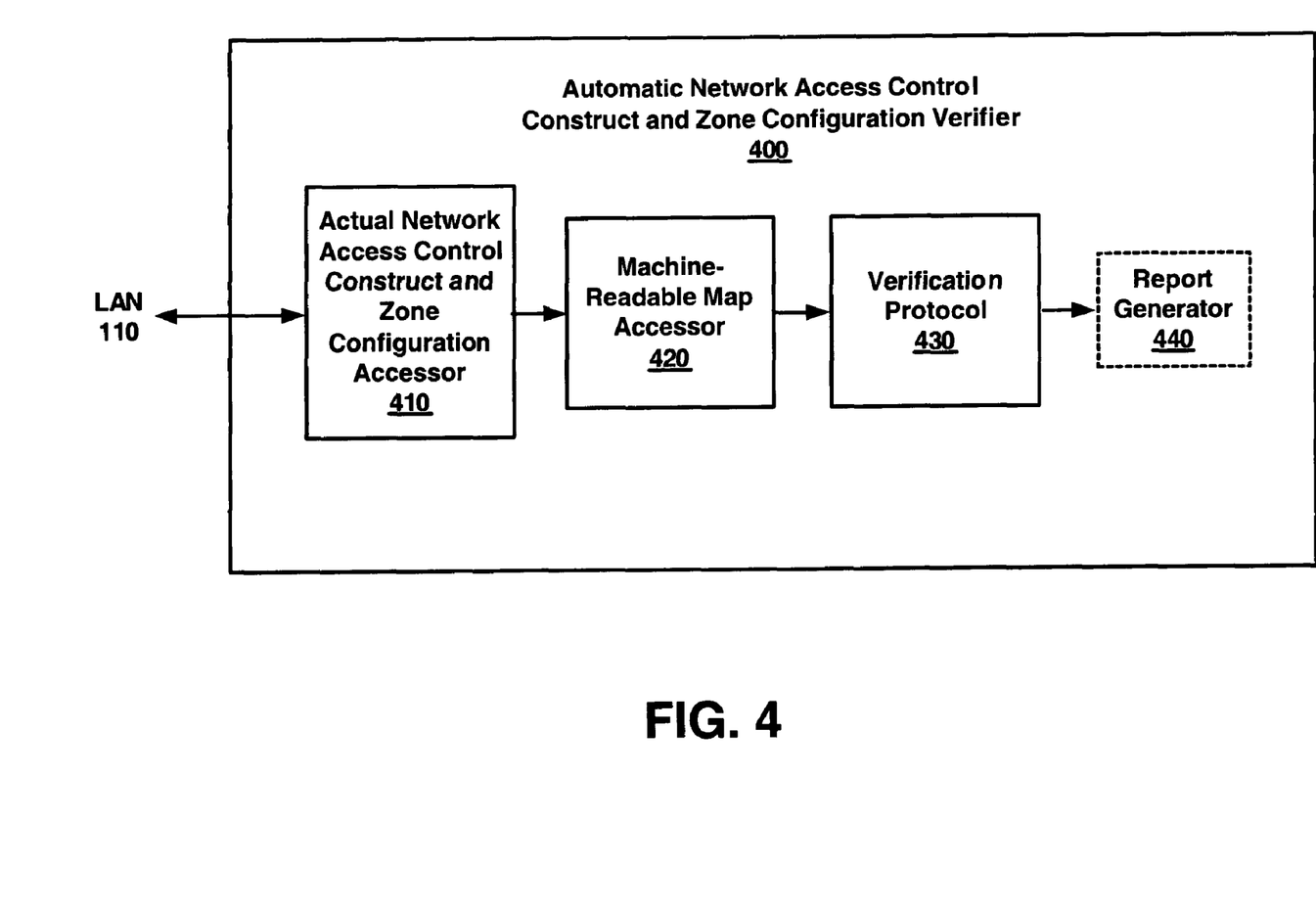
FIG. 4 is a block diagram of an exemplary automatic network access control construct and zone configuration verifier in accordance with one embodiment of the present invention.

With reference now to FIG. 4, a block diagram 400 of an automatic verifier of a network access control construct and zone configuration for a network VSAN is shown in accordance with an embodiment of the present invention. In one embodiment, the network access control construct and zone configuration verifier 400 includes an actual network access control construct and zone configuration accessor 410. The network access control construct and zone configuration verifier 400 also includes a machine-readable map accessor 420. The network access control construct and zone configuration verifier 400 further includes a verification protocol 430. In one embodiment, the network access control construct and zone configuration verifier 400 also includes an optional report generator 440.

As described herein, network access control construct and zone configuration verifier 400 is utilized to verify that the devices accessing the SAN are the correct device and that no other connections are inappropriately accessing the SAN. In operation, the network access control construct and zone verifier 400 initially utilizes the network access control construct and zone accessor 410 to accesses a network access control construct, such as ACL 310 of FIG. 3. The network access control construct and zone accessor 410 then receives the status of the network access control construct (e.g., ACL 310). For example, the WWN (or other identifier) of the device authorized to access (or actually accessing) the network switch 300 via the connector 315.

The network access control construct and zone configuration verifier 400 then utilizes the actual network access control construct and zone accessor 410 to accesses a zone configuration, such as zone 375 of FIG. 3.

The network access control construct and zone configuration verifier 400 then utilizes the machine-readable map accessor 420 to access the machine-readable map (e.g., map 165 of FIG. 1) and retrieve the WWN of the device which is supposed to be authorized to access the network switch 300 via the connector 315 and the list of devices which are supposed to be included within zone 375.

The network access control construct and zone configuration verifier 400 then utilizes the automatic verification protocol 430 to compare the results from the actual network access control construct and zone configuration accessor 410 to the results from the machine-readable map accessor 420. In one embodiment, once the results are compared, the optional report generator 440 generates a report. The report may be a report stating that the network access control construct and zone configuration is correct, or that it is incorrect, that it is missing, or the like.

In another embodiment, if the result of the comparison of actual network access control construct and zone configuration to the network map network access control construct and zone configuration does not match, an automatic fix is applied via the network access control construct and zone configuration verifier 400. For example, the network access control construct and zone configuration verifier 400 will reapply the information from the network map to the actual network access control construct and zone configuration operating on the SAN fabric.

Figure 5:
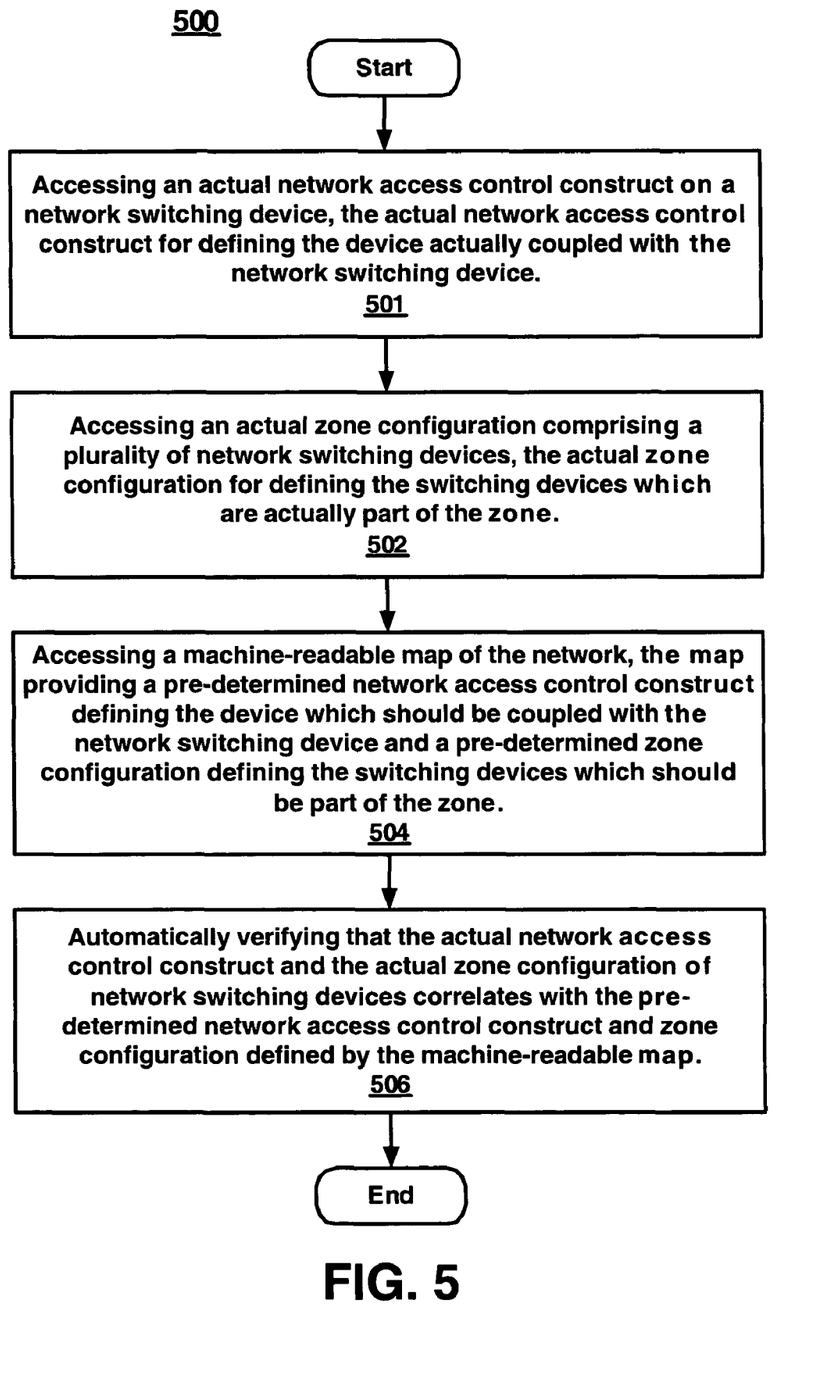
FIG. 5 is a flowchart of a method for automatic verification of a network access control construct and zone configuration for a network switch in accordance with one embodiment of the present invention.

Referring now to FIG. 5, a flowchart of one method for automatic verification of a network access control construct and zone configuration for a plurality of network switching devices is shown in accordance with one embodiment of the present invention.

With reference now to step 501 of FIG. 5, and to FIG. 2, one embodiment accesses an actual network access control construct on a network switching device, wherein the actual network access control construct is utilized for defining the device actually coupled with the network switching device. For example, the network access control construct and zone verifier 170 will contact a SAN switch (e.g., SAN switch 206) via a LAN and query the network access control construct (e.g., the ACL).

In one embodiment, the network access control construct and zone verifier 170 query will verify the network access control construct is the appropriate construct by receiving the unique identifier of the network access control construct. In another embodiment, the network access control construct and zone verifier 170 will verify the port number on the network switching device port to which the network access control construct is coupled. The network access control construct and zone verifier 170 will then query for a status of the network access control construct (e.g., operational, etc.) and the identifier of the computing device utilizing the construct to access the switch (e.g., via a specific port). In one embodiment, the identifier is a unique identifier for the computing device, such as a WWN.

In another embodiment, the automatic verification of network access control constructs for a network switch accesses a master network switching device 206A which provides a plurality of actual network access control constructs for a plurality of ports and/or network switches. In another embodiment, each network switch is accessed individually. In yet another embodiment, each port on each network switch is accessed individually.

With reference now to step 502 of FIG. 5, and to FIG. 2, one embodiment accesses an actual zone configuration including a plurality of network switching devices (or plurality of ports of one network switching device), the actual zone configuration for defining the switching devices which are actually part of the zone. For example, the network access control construct and zone configuration verifier 170 will contact a SAN zone (e.g., SAN zone 175) via a LAN and query the network access control construct.

In one embodiment, the network access control construct and zone configuration verifier 170 will verify that the soft zone configuration includes the appropriate devices by receiving the unique name of the zone. In another embodiment, the network access control construct and zone configuration verifier 170 will verify the WWN of the host bus adapter (HBA) port on the computational server (e.g., server 121). The network access control construct and zone configuration verifier 170 will then verify the WWN of the port on the storage array (e.g., LUN 131).

The following embodiment, pertains particularly to soft zones as described above. However, in another embodiment in which the present invention is employed, embodiments of the present invention pertain particularly to hard zones. In yet another embodiment, the present invention pertains to the utilization of both soft and hard zones. With respect to hard zones, the zone configuration verifier 170 will verify that the hard zone configuration includes the appropriate port identifier/switch identifier on the switch connected to a particular port on a computational server. The zone configuration verifier 170 will further verify that the hard zone configuration includes the appropriate port identifier/switch identifier on a switch connected to a particular port on a switch array.

In another embodiment, the automatic verification of the zone configuration accesses a master network switching device 206A which provides a plurality of actual zone configurations for a plurality of ports and/or network switches. In another embodiment, each network switch is accessed individually. In yet another embodiment, each port on each network switch is accessed individually.

With reference now to step 504 of FIG. 5, and to FIG. 2, one embodiment accesses a machine-readable map of the network, wherein the map provides a pre-determined network access control construct and zone configuration defining the devices which should be part of the network access control construct and zone. For example, the network access control construct and zone configuration verification program 170 will contact a machine-readable map 165 and query the map 165 regarding the specific network access control construct and zone configuration. As described herein, the query will include a status request of the network access control construct and zone configuration and the identifier of the computing devices that should be utilizing the connectors and switches (e.g., via a specific port). In one embodiment, the identifier is a unique identifier for the computing device, such as a WWN.

Referring now to step 506 of FIG. 5 and to FIG. 2, one embodiment automatically verifies that the actual network access control construct and zone configurations correlate with the pre-determined network access control construct and zone configurations defined by the machine readable map 165. For example, the verification will verify that the actual network access control construct and zone configuration is correct for the particular connectors, switches and devices to which it is associated. That is, a verification is performed by comparing the WWNs defined in the actual network access control construct and zone configuration with the WWNs defined in the machine-readable map pre-defined network access control construct and zone configuration.

In one embodiment, the verification protocol will validate that a corresponding zone has been defined in the SAN fabric. The verification protocol will validate that the list of WWN entries in the map corresponds with the WWN entries in the SAN fabric (e.g., the actual zone configuration). The verification protocol will also verify that the actual zone is correctly configured as either a hard zone, a soft zone, or both a hard zone and a soft zone.

In general, hard zoning is based on hardware and soft zoning is based on software. Basically, hard zoning is used for checking the port numbers of specified switches and soft zoning is used for checking the WWN that are the identifiers in the network card of the devices that are utilizing (or asking to utilize) the SAN. Therefore, as is well known in the art, the utilization of a hard zone provides a physical barrier to any device trying to improperly access the zone, while the utilization of a soft zone provides a virtual barrier to any device trying to improperly access the zone. Thus, the combination of a hard zone and a soft zone will limit access to the zone via the physical hardware assigned to the zone and the WWN (or other) identifiers associated with the software within the hardware.

In one embodiment, the network map contains the mappings of each LUN to each server. In another embodiment, the zones are not recorded in the machine-readable map's database, but can be inferred from the database entry of the corresponding LUN. That is, when a disk is first bound to a server, the map will record the binding of the disk LUN to the server. At that time, the zone is also created. Thus, a properly bound disk LUN should always have a zone associated with it, and the zone verification protocol will ensure that the zone really was created.

When the LUN to server mapping is compared to the actual zones for each LUN to server mapping, a comparison is performed between the WWN of the LUN to the list of WWN entries defined in the actual zone. Additionally, a comparison is performed between the WWN of the server to the list of WWN entries defined by the actual zone. After examining all the LUN-to-server mappings, verification is performed to ensure that there are no LUNs that were not checked in the prior validation. That is, verify that there are no LUNs that don't have an associated zone in the map. Another verification is performed to ensure that there are no servers that were not checked in the prior validation. That is, verify that there are no servers that don't have an associated zone in the map.

Verification is then performed to ensure that every actual network access control construct and/or zone configuration is defined in the machine-readable map pre-defined network access control construct and zone configuration. That is, to ensure that there are no remaining actual network access control construct and/or zone configuration in the network (e.g., the SAN) that have not been examined. In other words, verify that there are no actual network access control construct and/or zone configurations in the SAN fabric that do not have an associated network access control construct and/or zone configuration in the machine-readable map. This verification ensures that an actual network access control construct and/or zone configuration has not been removed or overlooked from the SAN fabric.

Referring still to step 506 of FIG. 5, in one embodiment, each time an error is found during the verification process, an error message is provided indicating the details of the actual network access control construct and/or zone configuration error. In one embodiment, the error message may also provide instructions for automatic correction of the network access control construct and zone configuration error. For example, the error message may contain machine-readable code that can be automatically utilized to fix the error associated with the network access control construct and/or zone configuration. In another embodiment, the verification process may automatically fix the error associated with the network access control construct and/or zone configuration and provide a report of the error. In yet another embodiment, the verification process may automatically fix the error and provide an "actions taken" message as a portion of the error message.

In one embodiment, the automatic verifier will provide a report documenting the result of the automatic verifying. That is, providing a user-readable report outlining the results of the analysis including correctly defined network access control construct and/or zone configurations. The report may include the number of network access control construct and zone configurations verified, the identifier of each of the network access control construct and zone configurations, the switch and/or port identifiers associated with each network access control construct and zone configuration, the WWN of the device coupled with the network access control construct and zone configuration, and the like. In another embodiment, the report may be configured to provide whatever information the data center administrator desires. That is, the report format, output and information thereon are adjustable based on user preference.

Figure 6:
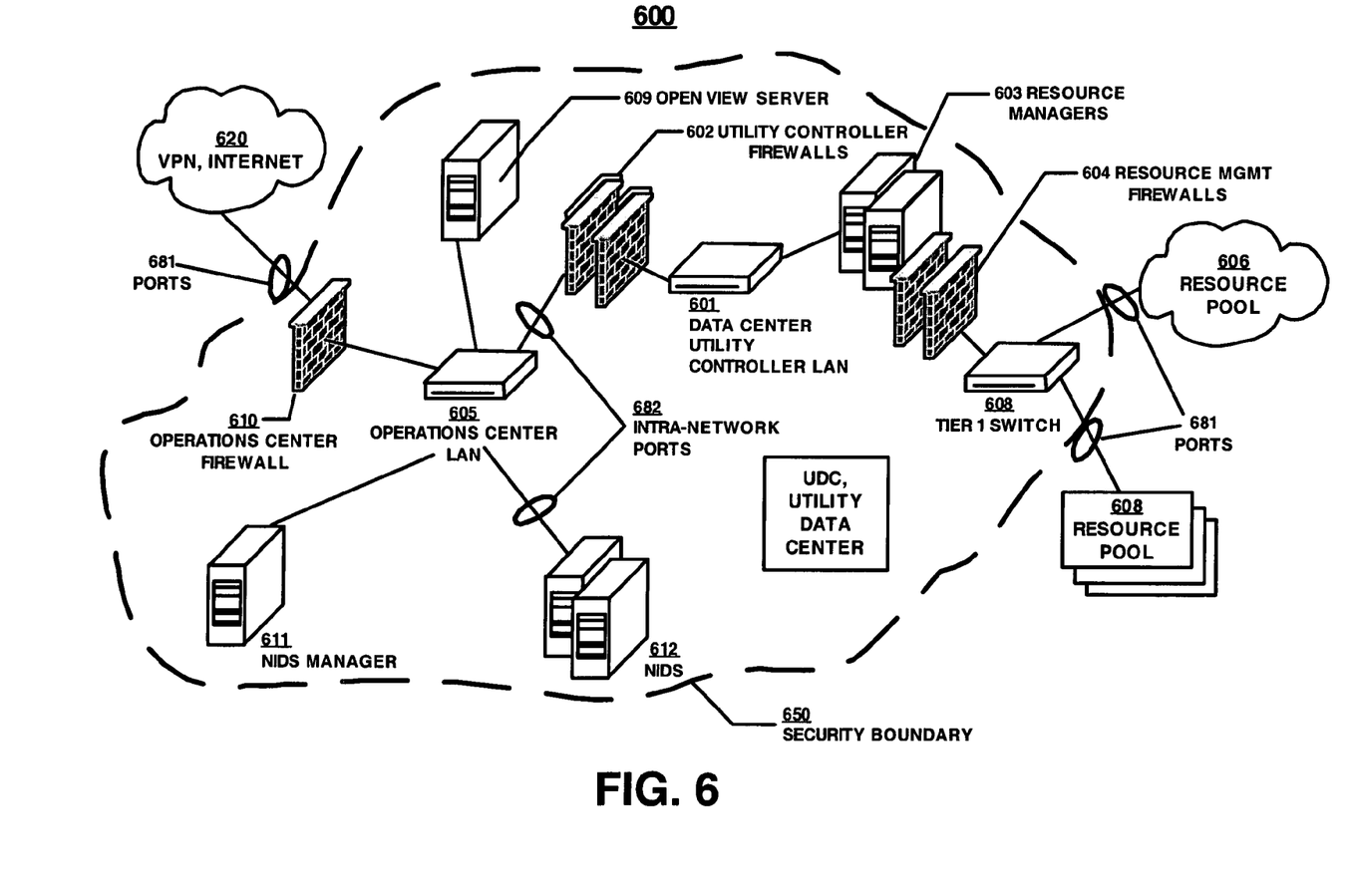
FIG. 6 illustrates a utility data center in accordance with one embodiment of the present invention.

FIG. 6 illustrates an exemplary provisionable network in which embodiments of the present invention can function. Provisional network, or utility data center (UDC), 600 is shown bounded by a security boundary 650. In one embodiment, the security boundary 650 is a virtual security boundary. Boundary 650 is shown here only to help illuminate the concepts presented herein. Typical UDC 600 comprises an operations center local area network (LAN) 605, a data center utility controller LAN 601 and resource pools 606. It is noted here that, by their very nature, UDCs are flexible in their composition, comprising any number and type of devices and systems. It is this flexibility from which they derive their usefulness. The specific architecture illustrated in FIG. 6, therefore, is not meant to limit the application of embodiments of the present invention to any particular provisionable network architecture.

Typical UDC 600, in this illustration, communicates with the outside world via the Internet 620 and virtual public networks (VPNs) in the Internet. The communications links that enable this communication are protected by firewall 610. Firewall 610 is shown to illustrate a concept and is not meant to imply any particular method or system of intrusion protection. Many types of hardware and software firewalls are well known in the art and firewall 610 may be either or both.

It is noted here that communications into and out of a provisionable network, as in any network, is accomplished through ports such as illustrated at 681. Communications between devices within a network are also conducted through ports, as alluded to at 682. It is noted that ports are not necessarily physically located at the periphery of a network but are logical end points. External ports 681 and intra-network ports 682 are shown only to help illustrate the concepts presented in embodiments of the present invention. It is also noted that virtual security boundary 650 does not exist in a physical sense. Resources included in the servers and LANs comprising utility data center 600 may include devices and servers located remotely from the other elements of the UDC.

Embodiments of the present invention operate in an environment that distinguishes between three trust domains established in the trust hierarchy of a utility data center. One trust domain is embodied in the Operations Center (OC) LAN 605 where non-critical UDC and other operations-related functions reside. The level of trust is less than the data center utility controller LAN 601. Another trust domain is the data center utility controller LAN 601 where tasks relating to the automated provisioning of managed resources 606 reside. Access to the data center utility controller LAN 601 is severely restricted from this domain. A third domain comprises the managed resources LANs where the managed resources 606 reside. These LANs are typically not trusted. It is noted here that clients of the utility data center originate outside the above trust structure and access elements of the UDC via the Internet or a virtual private network (VPN) resident in the Internet infrastructure.

As shown in FIG. 6, operations center (OC) LAN 605 comprises an internal trust domain. Included in OC LAN 605 are open view server 609, network intrusion detection system (NIDS) 612 and NIDS manager 611. It is noted that, though NIDS 612, NIDS manager 611 are illustrated as computer-like devices, their physical existence is not limited to a particular device. Each may exist as a standalone device or implemented as software resident in a physical device or server.

The heart of the exemplary utility data center illustrated in FIG. 6 is the data center utility controller (UC) LAN, 601. This LAN represents another, higher, internal trust domain. UC LAN communicates through OC LAN 605 and is typically separated from it by various forms of firewalls 602. UC LAN 601 can comprise various numbers of resource managers, such as illustrated at 603. The flexibility inherent in the UDC concept can result in many combinations of resources and resource managers. Resource managers 603 are the typical interface with the various pools of resources 606, communicating with them through ports and some sort of switching network as indicated by the tier 1 switch at 608.

In one embodiment, the resource managers 603 include an actual network access control construct and zone configuration accessor for accessing the actual network access control construct and zone configuration coupled with a port of a network switch. The actual network access control construct and zone configuration defining the device actually coupled with the port of the network switch. In addition, the resource manager 603 also includes a verification protocol for verifying that the actual network access control construct and zone configuration on the port of the network switch correlates with the pre-determined network access control construct and zone configuration defined by the machine-readable map. In another embodiment, the verification protocol may reside on a separate computing system within the UDC. In yet another embodiment, the verification protocol may reside on a plurality of the computing systems within the UDC.

Resource pools 606 are limitlessly flexible, comprising any conceivable combination of data servers, computational capability, load balancing servers or any other device or capability imaginable. Because the possible varieties of resources that can be included in resource pools 606, they are separated from UC LAN 601 by firewalls 604, which, like UC firewalls 602, can be software or hardware or both, in many combinations.

It is noted that embodiments of the present invention can run in many different environments. One network management environment in which an embodiment operates serves as an end-to-end service management infrastructure and is particularly well suited to managing a provisionable network which can also be known as a utility data center (UDC).

In summary, embodiments of the present invention provide methods and systems for automatic verification of a network access control construct and zone configuration of a plurality of network switches. By using the methods and systems for automatic verification of a network access control construct and zone configuration of a plurality of network switches, one or more switches (e.g., SAN switches) can be automatically checked for correctness of their configured network access control constructs and zones. By using the automated method, correctness of the configuration of networked devices can be verified in much less time, at greatly reduced expense.

In addition, the present invention allows a network administrator to automatically discover network access control construct and zone configuration problems in a SAN configuration. The problems include, but are not limited to, forgotten network access control construct and/or zone definitions that should have been deleted, missing network access control constructs and/or zones that were omitted by mistake, incorrect network access control constructs and zones caused by user error, security-breaching network access control construct and zone changes introduced maliciously, and the like. In one embodiment, the corrective action is taken automatically, thereby reducing human error, reducing cost and increasing security.

Additionally, by running automatically, the verifier can be run often, or constantly to provide an ongoing validation of the network. Moreover, the present invention provides automation of the network access control construct and zone-checking portion of a security audit. Therefore, the report is valuable even when reporting no errors with respect to the network access control constructs and zones. That is, a report having no zone errors provides validation of the operation of the network access control constructs and zones throughout the network (e.g., the SAN).

Embodiments of the present invention are thus described. While the present invention has been described in particular embodiments, it should be appreciated that the present invention should not be construed as limited by such embodiments, but rather construed according to the following claims.

I claim:

1. A method for automatic verification of zone configurations and network access control constructs for a plurality of network switching devices comprising:

accessing an actual network access control construct on a network switching device, the actual network access control construct for defining the device actually coupled with the network switching device, wherein the network switching device is one of the plurality of network switching devices, wherein the plurality of network switching devices includes network switching devices, which are defined by an actual zone configuration and are actually part of a zone that comprises the network switching devices defined by the actual zone configuration, wherein the plurality of network switching devices includes network switching devices defined by a pre-determined zone configuration, which should be part of the zone, wherein the plurality of network switching devices includes network switching devices included in a machine-readable map of the network, accessing the actual zone configuration;

accessing the machine-readable map of the network, the map is separate from a storage area network (SAN) that includes the plurality of network switching devices and provides a pre-determined network access control construct defining the device, which should be coupled with the network switching device, and the pre-determined zone configuration defining the network switching devices, which should be part of the zone; and automatically verifying that the actual network access control construct and the actual zone configuration correlates with the pre-determined network access control construct and the pre-determined zone configuration defined by the machine-readable map, wherein the verifying is performed by a verifying protocol associated with a Utility Data Center (UDC) that is located separate from the SAN.

2. The method of claim 1 further comprising:
providing a report documenting the result of the automatically verifying of the network access control construct and zone configuration.

3. The method of claim 1 further comprising:
accessing a plurality of actual network access control constructs and zone configurations via a master network switching device.

4. The method of claim 1 wherein for each of the network access control constructs and zones in the network map, the automatically verifying further comprises:

verifying that a corresponding actual network access control construct and zone configuration has been defined in the network fabric;

comparing the World Wide Name (WWN) defined in the actual network access control construct and zone with the WWN defined in the machine-readable map pre-defined network access control construct and zone configuration; and verifying that the actual zone is configured as a "soft zone".

5. The method of claim 1 wherein for each of the zones in the network map, the automatically verifying further comprises:

verifying that a corresponding actual zone configuration has been defined in the network fabric;

comparing the port number of a switch connected to a computational server defined in the actual zone configuration with the port number of a switch connected to a computational server defined in the machine-readable map pre-defined zone configuration;

comparing the port number of a switch connected to a storage array defined in the actual zone configuration with the port number of a switch connected to a storage array defined in the machine-readable map pre-defined zone configuration; and verifying that the actual zone is configured as a "hard zone".

6. The method of claim 1 wherein the network map further comprises:

inferring the zone configuration based on a database entry of a corresponding disk logical unit (LUN), wherein when a disk is first bound to a server, the network map records the binding of the disk LUN to the server and creates the zone configuration for the map.

7. The method of claim 6 wherein the LUN to server mappings further comprise:

comparing the World Wide Name (WWN) of the LUN to a list of WWN entries defined in the actual zone configuration; and comparing the WWN of the server to a list of WWN entries defined in the actual zone configuration.

8. The method of claim 7 further comprising:
providing a machine-readable script containing instructions for the automatic correction of the actual network access control construct and zone configuration.

9. The method of claim 1 wherein the automatically verifying further comprises:

verifying that every actual network access control construct and zone configuration in the network fabric is defined in the machine-readable map pre-defined network access control construct and zone configuration.

10. The method of claim 1 wherein the automatically verifying further comprises:

verifying that every actual zone configuration in the machine-readable map pre-defined zone configuration is defined in the network fabric.

11. The method of claim 1 wherein the automatically verifying further comprises:

verifying that each zone implied by a server to disk binding recorded in the network map is in fact implemented as a zone in the network fabric.

12. The method of claim 1 wherein each time an error is found the method further comprises:

providing an error message indicating the details of the actual network access control construct and zone configuration error; and providing instructions for automatic correction of the network access control construct and zone configuration error.

13. An apparatus for performing automatic verification of a network access control construct comprising:

a processor;

an actual network access control construct and zone configuration accessor for accessing an actual network access control construct and zone configuration for defining network switches and a device that are part of the actual network access control construct and zone;

a machine-readable map accessor for accessing a machine-readable map showing the device coupled with the network switch, the machine-readable map is located separate from a storage area network (SAN) that includes the network switches and provides a pre-determined network access control construct and zone configuration defining devices and network switches that should be part of the network access control construct and zone; and an automated verification protocol for verifying that the actual network access control construct and zone configuration is in compliance with the pre-determined network access control construct and zone configuration defined by the machine-readable map, wherein the automated verification protocol is associated with a Utility Data Center (UDC) that is located separate from the SAN.

14. The apparatus of claim 13 wherein said network switch is a portion of an information system network comprising:
at least one computing device;
at least one storage device; and
at least one storage area network (SAN) switching device for creating interconnects between said computing system and said storage device.

15. The apparatus of claim 14 wherein said SAN switching device further comprises:
at least one SAN network access control construct and zone defining the SAN switching device and at least one port thereon which are allowed to communicate.

16. The apparatus of claim 14 wherein said machine-readable map of networked devices comprises:
a network map of the details of cabling between devices and the details of each network access control construct and zone configuration.

17. The apparatus of claim 16 wherein said zone configuration comprises:
an identifier for a soft zone configuration;
a world-wide name (WWN) of a host bus adapter (HBA) port on a computational server; and
a world-wide name (WWN) of a port on the storage array.

18. The apparatus of claim 16 wherein said zone configuration comprises:
an identifier for a hard zone configuration;
a port number of a switch connected to a computational server; and
a port number of a switch connected to a storage array.

19. The apparatus of claim 13 further comprising:
a report generator for generating a report documenting the results of the automated verification protocol.

20. The apparatus of claim 13 wherein said network access control construct is an access control list (ACL) comprising:
an identifier for the network access control construct;
a port number on the network switching device port to which the network access control construct is coupled; and
a world-wide name (WWN) of a computing device authorized to be connected to the network switching device port.

21. A non-transitory computer-usable medium having computer-readable program code stored therein for causing a method for automatic verification of a zone configuration and network access control construct for a plurality of network switching devices, comprising:
accessing an actual network access control construct on a network switching device, the actual network access control construct for defining the device actually coupled with the network switching device,
wherein the network switching device is one of the plurality of network switching devices,
wherein the plurality of network switching devices includes network switching devices, which are defined by an actual zone configuration and are actually part of a zone that comprises the network switching devices defined by the actual zone configuration,
wherein the plurality of network switching devices includes network switching devices defined by a pre-determined zone configuration, which should be part of the zone,
wherein the plurality of network switching devices includes network switching devices included in a machine-readable map of the network,
accessing the actual zone configuration;
accessing the machine-readable map of the network, the map is located separate from a storage area network (SAN) that includes the plurality of network switching devices and provides a pre-determined network access control construct defining the device, which should be coupled with the network switching device, and the pre-determined zone configuration defining the network switching devices, which should be part of the zone; and
automatically verifying that the actual network access control construct and the actual zone configuration correlates with the pre-determined network access control construct and the pre-determined zone configuration defined by the machine-readable map, wherein the verifying is performed by a verifying protocol associated with a Utility Data Center (UDC) that is located separate from the SAN.

22. The non-transitory computer-usable medium of claim 21 further comprising:
providing a report documenting the result of the automatically verifying of the network access control construct and zone configuration.

23. The non-transitory computer-usable medium of claim 21 further comprising:
accessing a plurality of actual network access control constructs and zone configurations via a master network switching device.

24. The non-transitory computer-usable medium of claim 21 wherein for each of the network access control constructs and zones in the network map, the automatically verifying further comprises:
verifying that a corresponding actual network access control construct and zone configuration has been defined in the network fabric;
comparing the World Wide Name (WWN) defined in the actual network access control construct and zone configuration with the WWN defined in the machine-readable map pre-defined network access control construct and zone configuration; and
verifying that the actual zone is configured as a "soft zone".

25. The non-transitory computer-usable medium of claim 21 wherein for each of the zones in the network map, the automatically verifying further comprises:
verifying that a corresponding actual zone configuration has been defined in the network fabric;
comparing the port number of a switch connected to a computational server defined in the actual zone configuration with the port number of a switch connected to a computational server defined in the machine-readable map pre-defined zone configuration;
comparing the port number of a switch connected to a storage array defined in the actual zone configuration with the port number of a switch connected to a storage array defined in the machine-readable map pre-defined zone configuration; and
verifying that the actual zone is configured as a "hard zone".

26. The non-transitory computer-usable medium of claim 21 wherein the network map further comprises:
  inferring the zone configuration based on a database entry of a corresponding disk logical unit (LUN), wherein when a disk is first bound to a server, the network map records the binding of the disk LUN to the server and creates the zone configuration for the map.

27. The non-transitory computer-usable medium of claim 26 wherein the LUN to server mappings further comprise:
  comparing the World Wide Name (WWN) of the LUN to a list of WWN entries defined in the actual zone configuration; and
  comparing the WWN of the server to a list of WWN entries defined in the actual zone configuration.

28. The non-transitory computer-usable medium of claim 21 wherein the automatically verifying further comprises:
  verifying that every actual network access control construct and zone configuration in the network fabric is defined in the machine-readable map pre-defined network access control construct and zone configuration.

29. The non-transitory computer-usable medium of claim 21 wherein each time an error is found the method further comprises:
  providing an error message indicating the details of the actual network access control construct and zone configuration error; and
  providing instructions for automatic correction of the network access control construct and zone configuration error.

30. The non-transitory computer-usable medium of claim 27 further comprising:
  providing a machine-readable script containing instructions for the automatic correction of the actual network access control construct and zone configuration.

31. A data center comprising:
  a plurality of devices, with each of the devices represented in a machine-readable map, the map is located separate from a storage area network (SAN) that includes network switches and provides a pre-determined zone configuration defining the devices which should be coupled with at least one network switch;
  wherein at least one of the plurality of devices comprises:
  an actual network access control construct and zone configuration accessor for a network, the actual network access control construct and zone configuration accessor for accessing the devices of a network access control construct and zone configuration; and
  an automatic verification protocol for verifying that the actual network access control construct and zone configuration of the network correlates with a pre-determined network access control construct and zone configuration defined by the machine-readable map, wherein the verifying protocol is associated with a Utility Data Center (UDC) that is located separate the SAN.

32. The data center of claim 31 further comprising:
  a report file containing a message generated by said verifying protocol.

33. The data center of claim 31 wherein said zone configuration comprises:
  an identifier for the zone configuration;
  a world-wide name (WWN) of a host bus adapter (HBA) port on a computational server;
  a world-wide name (WWN) of a port on the storage array.

34. The data center of claim 31 wherein said zone configuration comprises:
  an identifier for a hard zone configuration;
  a port number of a switch connected to a computational server; and
  a port number of a switch connected to a storage array.

35. The data center of claim 31 wherein said network access control construct is an access control list (ACL) comprising:
  an identifier for the network access control construct;
  a port number on the network switching device port to which the network access control construct is coupled; and
  a world-wide name (WWN) of a computing device authorized to be connected to the network switching device port.

36. The data center of claim 31 wherein said network is the storage area network (SAN).

* * * * *

UNITED STATES PATENT AND TRADEMARK OFFICE
CERTIFICATE OF CORRECTION

| | | |
|---|---|---|
| PATENT NO. | : 8,144,618 B2 | Page 1 of 1 |
| APPLICATION NO. | : 11/048311 | |
| DATED | : March 27, 2012 | |
| INVENTOR(S) | : David Andrew Graves | |

It is certified that error appears in the above-identified patent and that said Letters Patent is hereby corrected as shown below:

In column 18, line 13, in Claim 31, delete "separate the" and insert -- separate from the --, therefor.

Signed and Sealed this
Nineteenth Day of February, 2013

Teresa Stanek Rea
*Acting Director of the United States Patent and Trademark Office*